May 29, 1951  C. H. ANDERSON  2,554,550
MANIFOLD ARRANGEMENT

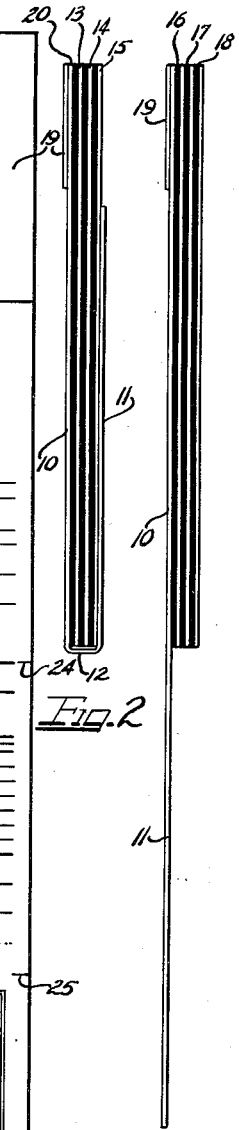

Filed July 16, 1948  2 Sheets-Sheet 2

_Fig. 4_

Inventor
CARL H. ANDERSON by The Firm of Charles W. Hills
Attys.

Patented May 29, 1951

2,554,550

UNITED STATES PATENT OFFICE 2,554,550

MANIFOLD ARRANGEMENT

Carl H. Anderson, Chicago, Ill., assignor to Lumbermen's Mutual Casualty Company, Chicago, Ill., a corporation of Illinois Application July 16, 1948, Serial No. 39,100

2 Claims. (Cl. 283—24)

This invention relates to manifold arrangements of sheets of printed forms and sheets of carbon paper for producing a plurality of copies in one operation.

The invention is particularly useful for insurance policies which must be prepared in multiple copy form, because of varied uses to which the copies are put, each copy having a substantial amount of printed matter previously printed thereon and having blank spaces for the addition of other information and data at the time the policy is prepared for signature.

The general object of the invention is to provide a multiple copy form prepared as a unit package which during one insertion into the typewriter may have as many blank spaces thereon filled in as need be filled in by the agent at the time the policy is prepared.

Another object of the invention is to provide unit packages of multiple copy insurance policies, with carbon sheets interleaved between them arranged in a block so that one single unit may be detached therefrom without disturbing the other units and which will contain all of the copies in proper arrangement for insertion into the typewriter.

Various other objects and advantages of the invention will be mentioned hereinafter specifically or will become apparent from a perusal of the following specification, in which a preferred embodiment of the invention is shown and described.

In the drawings:

Figure 1 is a plan view of the top face of one of the unit packages made in accordance with this invention;

Figure 2 is an edge view of the same package on a reduced scale;

Figure 3 is an edge view of the same package, on the same reduced scale showing the sheet constituting the policy, unfolded and extended partially from the unit pack; and Figure 4 is a plan view in which portions of the second sheet and a carbon sheet of the pack are torn away.

As shown on the drawings:

The form of the invention shown in the drawings illustrates the use of the invention in the forming of a unit pack for an automobile insurance policy, consisting of one original sheet, approximately double the size of the other sheets and itself constituting the insurance policy to be given to the insured, one copy for the home office of the insurance company, one copy for the branch office and one copy for the agent who signs and issues the policy.

While dimensions are not of the essence of the invention, the dimensions of a preferred form of this invention will be herein set forth in order to facilitate an understanding of the invention and the manner of its use.

The policy itself comprises a continuous sheet having a face portion 10 on which the declarations are to be typed and an extension 11 of the same sheet which is normally folded at 12 inwardly and upon the back face of each unit pack, the inside faces of the portions 10 and 11 affording ample space and being used for the principal printed paragraphs of the agreement constituting the insurance policy, in addition to those paragraphs which begin on the front page of the section 11. The section 10 is approximately fourteen inches long, the section 11 about ten and one-quarter inches long and the policy is about eight and one-half inches wide.

It may be noted here that the fold line indicated by the numeral 12 in Fig. 2 is in actual practice a sharp fold line, the drawing exaggerating the thickness of the pack merely to show the arrangement of the various sheets of form paper and of carbon paper between them.

The pack additionally contains three sheets of forms 13, 14 and 15, each eight and one-half inches by fourteen inches, together with the carbon sheets 16, 17 and 18 each lying upon the face of the form with which it coacts. There is further the flap 19 which is less than one-quarter of the length of sheets 13, 14 and 15, and whose purpose will be more fully described later.

While Fig. 2 shows only a single unit or pack it should be understood that in practice a considerable number of these units will be superposed one upon the other and the top edges of all of the individual form sheets and carbon sheets in all the packs will be secured to an adhesive binder 20 of ordinary type preferably carrying threads to reinforce the adhesive. However, when a plurality of these units is arranged in a single block of packs, the policy 10—11 will be folded around its associated copy sheets 13, 14 and 15 as illustrated in Fig. 2, with the edge of sheet 11 terminating short of the edge of the adjacent flap 19. Hence when the agent or authorized representative is about to insert the data in a policy he merely feels for the folded edge 12 which marks the separation of one complete unit from another, lifts the top unit and tears that entire unit off from the binder 20. By this arrangement no disturbance of the remaining packs is caused and the agent is prevented from inadvertently failing to pick up a complete group of copies.

When the agent shall have removed one of these units from the block of policy units he will first unfold the section 11 to cause the unit to assume the position shown in Fig. 3, and then insert the pack, without any further disturbance thereof into his typewriter.

The agent will first type upon the flap 19 in the blank spaces provided therefor the information suggested by the printed matter shown in Figure 1. This blank including the printed matter and blank spaces will here be designated by the numeral 21. Blanks exactly like the blank 21 are printed on the copy sheets 13, 14 and 15 beneath blank 21, hence the information called for in blank 21 will simultaneously be imprinted by the carbon papers upon the agent's copy 13, the branch office copy 14 and the home office copy 15.

The next blank form to be filled in on the typewriter by the agent will be the space designated by the reference numeral 22. This form 22 is exactly duplicated thereunder on each of the underlying copies 13, 14 and 15, hence all of the important information which Fig. 1 indicates is called for by the form 22 will simultaneously be imprinted on these copies for the use of the agent, the branch office and the home office.

The next and final form to be filled in by the agent on his typewriter is the form 23, located on the title page section 23' of the policy and which, as indicated in Fig. 1, sets forth the name of the insured, his address, the effective date of his policy, the make of his car, the name of the agent and the agent's address, the state, the expiration date and the motor number of the car, the policy number, whether or not the policy is a renewal and data relating to the dividends. The same information just mentioned is simultaneously imprinted through the use of the carbon papers on identical forms on the copy sheets 13, 14 and 15.

The pack may then be removed from the typewriter, the flap 19 torn off and thrown away, and the policy consisting of the sheet 10—11 is again folded upon the line 12, then is folded double at the position of the mark 24 and again folded at the position of the mark 25 to produce a folded policy having outside dimensions of a little over three and one-half inches wide and eight and one-half inches long, with the total portion embraced within the form 23 on the outside of the folded policy, by means of which this policy may be immediately identified by the holder thereof, even when fully folded as described.

Referring now to the agent's copy, shown as the top sheet in Fig. 4, this sheet will then have thereon the data typed during the filling in of the blank forms 21, 22 and 23. The space 26 is provided for subsequent insertion of information, if necessary, on cancellation of the policy, and another space designated as 27 and which in Fig. 4 is shown on sheet 14, is for the information on renewal. A corresponding form is similarly located on sheet 13.

The agent's sheet is further provided with tear lines 28, 29, 30, 31 and 32, and when the sheet is torn along these lines there will then be detached a rectangular card about two and one-half inches wide by three and three-quarters inches long, bounded by the lines 29, 30, 32 and 31 which will have already imprinted thereon the information provided during the typing of form 23, which card may then be inserted into an identification envelope and handed to the policy holder.

The agent will then retain for his files the remainder of sheet 13.

Referring now to the branch office copy 14, as shown in Fig. 4, this copy will contain all of the information provided during the typing of forms 21, 22 and 23 and also provides an additional form generally indicated by the numeral 33 in which the branch office will insert various data in connection with the details of record keeping, bookkeeping, collection of premiums and the payment of dividends. The space occupied by form 33, it will be noted, does not underlie any of the forms 21, 22 or 23.

At the bottom of the branch office copy 14 there is provided a card to be kept in the branch office card file, and for this purpose sheet 14 is preferably made of heavier paper than the policy itself or sheet 13, that is, heavy enough to constitute a durable card for a filing system. This card, however, is larger than the card torn from sheet 13 and handed to the policy holder. Its boundaries will be defined by tear lines which correspond in location with the tear lines 29 and 30 shown in Fig. 4. The tear lines 31 and 32 of sheet 13 are not duplicated on sheet 14. Hence the card torn from sheet 14 is substantially larger, in fact, three inches by five inches in dimension and will fit a standard card filing case. This card which is herewith designated as 34 may contain additional information to be inserted at the branch office in the form space 35. Accordingly, when card 34 has been torn off and the remainder of the sheet 14 torn off along a tear line corresponding with line 28, the remaining portion of the sheet then becomes a part of the branch office records.

The bottom sheet in the pack, sheet 15 for the use of the home office will usually be identical with sheet number 14 and will have a card corresponding in position and size with the card 14 which may be torn therefrom.

It will now be understood that during one insertion in the typewriter the agent places upon the policy itself, upon the three copy sheets and upon the three detachable cards the essential information initially required for them and called for in the forms 21, 22 and 23. Hence, without any more effort or time than is required for typing in the absolutely necessary information on the policy itself the agent has filled in records for his own office, branch office, home office and typed in the essential information on three detachable cards. Despite the facility with which all of these additional records are prepared simultaneously, the policy handed to the policy holder is not required to assume any unnatural appearance nor to be disarranged in the making of these additional records. The use of the forms in the manner described is not only a great convenience and a time saver for the agent, but since he has no further data to insert in the various office copies the likelihood of making mistakes subsequently to the completion of the policy is thereby totally eliminated. It is natural to assume that the policy itself will be filled in with the utmost care, and being subject to the inspection of the policy holder its accuracy may thereby be guaranteed.

While the drawings and specification herein describe the invention as applied to an automobile insurance policy, it should be understood

I claim as my invention:

1. An assembly of manifold sets including a plurality of printed form sheets and interleaved carbon sheets arranged in units, each unit comprising a first sheet arranged to be a ribbon copy and at least one additional sheet arranged to be a carbon copy, an interleaved carbon sheet, and a flap arranged to be an instruction sheet overlying the unit, all of said sheets of all said units being secured together at the top edge to form the assembly, said first sheet of each unit being longer than its associated carbon and additional sheets and being folded back under the bottom edges of said carbon and additional sheets to form a unit, the folded back end of said first sheet terminating short of said flap, whereby each unit is of uniform thickness so that the assembly may lie substantially flat.

2. An assembly of manifold sets including a plurality of printed form sheets and interleaved carbon sheets arranged in units, each unit comprising a first sheet arranged to be a ribbon copy and at least one additional sheet arranged to be a carbon copy, an interleaved carbon sheet, and a flap arranged to be an instruction sheet overlying the unit, all of said sheets of all said units being secured together at the top edge to form the assembly, said first sheet of each unit being longer than its associated carbon and additional sheets and being folded back under the bottom edges of said carbon and additional sheets to form a unit, the folded back end of said first sheet terminating short of said flap, whereby each unit is of uniform thickness so that the assembly may lie substantially flat, at least one of said additional sheets of each unit having weakened lines of severance and being formed of relatively stiffer paper, whereby to present a smooth surface between the terminations of the flap and first sheet while applying intelligence to the unit and thereafter to permit severance thereof into relatively stiff individual cards.

CARL H. ANDERSON.

REFERENCES CITED

The following references are of record in the file of this patent:

UNITED STATES PATENTS

| Number | Name | Date |
|---|---|---|
| 1,199,692 | Greenstein | Sept. 26, 1916 |
| 1,254,560 | Abel | Jan. 22, 1918 |
| 2,292,681 | Anderson | Aug. 11, 1942 |
| 2,406,267 | Tambert | Aug. 20, 1946 |
| 2,458,955 | Moss | Jan. 11, 1949 |